United States Patent
Bretz

(10) Patent No.: US 12,534,249 B2
(45) Date of Patent: Jan. 27, 2026

(54) DEVICE AND METHOD FOR LOADING PACKAGING UNITS INTO A TRANSPORT CONTAINER

(71) Applicant: FERAG AG, Hinwil (CH)

(72) Inventor: Markus Bretz, Herrilberg (CH)

(73) Assignee: FERAG AG, Hinwil (CH)

(*) Notice: Subject to any disclaimer, the term of this patent is extended or adjusted under 35 U.S.C. 154(b) by 0 days.

(21) Appl. No.: 18/203,985

(22) Filed: May 31, 2023

(65) Prior Publication Data

US 2023/0382582 A1    Nov. 30, 2023

(30) Foreign Application Priority Data

| May 31, 2022 | (CH) | .............................. 0000657/2022 |
| Sep. 2, 2022 | (CH) | ................................ 001030/2022 |
| May 22, 2023 | (EP) | ..................................... 23174649 |
| May 22, 2023 | (EP) | ..................................... 23174650 |

(51) Int. Cl.
  *B65B 43/54* (2006.01)
  *B65B 5/04* (2006.01)
  (Continued)

(52) U.S. Cl.
  CPC .............. *B65B 43/54* (2013.01); *B65B 5/045* (2013.01); *B65B 25/20* (2013.01); *B65B 35/02* (2013.01);
  (Continued)

(58) Field of Classification Search
  CPC ......... B65B 25/20; B65B 35/02; B65B 43/26; B65B 43/54; B65B 5/045; B65B 5/101; B65B 61/04; B65B 61/06; B65D 73/0014; B65D 85/18; B65D 85/182; B65G 1/1376; B65G 1/1378; B65G 47/44; B65G 47/61; B65G 65/00; B65G 67/20
  See application file for complete search history.

(56) References Cited

U.S. PATENT DOCUMENTS

| 3,063,570 A | 11/1962 | Kroner |
| 3,703,841 A | 11/1972 | Crawford |

(Continued)

FOREIGN PATENT DOCUMENTS

| CH | 536 222 A   | 4/1973 |
| CH | 693 710 A5  | 12/2003 |

(Continued)

OTHER PUBLICATIONS

Machine translation of DE-102005027313-A1 to Schmidt (Year: 2006).*

(Continued)

*Primary Examiner* — Himchan Song
(74) *Attorney, Agent, or Firm* — Pauley Frickson & Swanson

(57) ABSTRACT

A device (6) for inserting goods units (3) into a transport container (8, 81) includes a module (61) for conveying a bundle (1) having a carrier strand (11, 11') on which a plurality of packaging units (2, 2', 2", 2''') are arranged one behind the other in a row; a module (62) for separating packaging elements (2, 2', 2", 2''') from a supplied bundle (1); and a module (63) for inserting packaging units (2, 2', 2", 2''') separated from the bundle (1) into a transport container (8, 81).

15 Claims, 12 Drawing Sheets

(51) Int. Cl.
    *B65B 25/20* (2006.01)
    *B65B 35/02* (2006.01)
    *B65B 43/26* (2006.01)
    *B65B 61/04* (2006.01)
    *B65B 61/06* (2006.01)
    *B65G 67/20* (2006.01)

(52) U.S. Cl.
    CPC .............. *B65B 43/26* (2013.01); *B65B 61/04* (2013.01); *B65B 61/06* (2013.01); *B65G 67/20* (2013.01)

(56) References Cited

U.S. PATENT DOCUMENTS

| | | | |
|---|---|---|---|
| 4,146,150 | A | 3/1979 | Low et al. |
| 5,611,430 | A | 3/1997 | Albrecht et al. |
| 6,089,367 | A * | 7/2000 | Anderson ............ B65D 81/264 |
| | | | 206/204 |
| 6,107,921 | A | 8/2000 | Eberhardt et al. |
| 7,683,283 | B2 | 3/2010 | Hanson et al. |
| 9,483,672 | B2 | 11/2016 | Pantaloni |
| 10,773,839 | B1 | 9/2020 | Talda et al. |
| 2004/0255556 | A1* | 12/2004 | Boal ...................... B65B 43/267 |
| | | | 53/511 |
| 2010/0254633 | A1 | 10/2010 | Andochick |
| 2012/0019364 | A1 | 1/2012 | Reichenbach et al. |
| 2012/0216917 | A1 | 8/2012 | Janzen |
| 2015/0324621 | A1 | 11/2015 | Reichenbach et al. |
| 2017/0275826 | A1 | 9/2017 | Fenile et al. |
| 2017/0282317 | A1 | 10/2017 | Guhl |
| 2017/0369250 | A1 | 12/2017 | Fenile et al. |
| 2018/0004992 | A1 | 1/2018 | Jacobsen |
| 2018/0072511 | A1 | 3/2018 | Fenile |
| 2018/0208407 | A1 | 7/2018 | Ruge et al. |
| 2018/0215547 | A1 | 8/2018 | Fenile et al. |
| 2019/0367277 | A1 | 12/2019 | Sigrist |
| 2019/0367282 | A1* | 12/2019 | Stauber .................. B65G 47/61 |
| 2020/0062515 | A1 | 2/2020 | Ramseier |
| 2021/0009351 | A1* | 1/2021 | Beinhofer .............. G06Q 10/08 |
| 2021/0053763 | A1 | 2/2021 | Fenile et al. |
| 2021/0171292 | A1 | 6/2021 | Fenile et al. |
| 2021/0395017 | A1 | 12/2021 | Stauber |
| 2023/0002096 | A1 | 1/2023 | Talda et al. |
| 2023/0382582 | A1* | 11/2023 | Bretz ...................... B65B 61/04 |
| 2024/0109679 | A1 | 4/2024 | Bretz |

FOREIGN PATENT DOCUMENTS

| | | | | |
|---|---|---|---|---|
| DE | 198 42 586 | A1 | 3/2000 | |
| DE | 102005027313 | A1 * | 12/2006 | .......... B65B 43/123 |
| DE | 10 2010 020 531 | A1 | 11/2011 | |
| EP | 1 642 836 | A1 | 4/2006 | |
| EP | 2 130 968 | A1 | 12/2009 | |
| EP | 2 161 214 | A1 | 3/2010 | |
| EP | 2 196 415 | A2 | 6/2010 | |
| EP | 2 418 160 | A1 | 2/2012 | |
| EP | 3 808 530 | A1 | 4/2021 | |
| JP | S48-51784 | A | 7/1973 | |
| JP | S53-63180 | U | 5/1978 | |
| JP | 4344851 | B2 | 10/2009 | |
| WO | WO 2004/000198 | A1 | 12/2003 | |
| WO | WO 2015/124524 | A1 | 8/2015 | |
| WO | WO 2017/088077 | A1 | 6/2017 | |
| WO | WO 2018/078098 | A1 | 5/2018 | |
| WO | WO 2018/162123 | A1 | 9/2018 | |
| WO | WO 2019/028485 | A1 | 2/2019 | |
| WO | WO 2020/146503 | A1 | 7/2020 | |

OTHER PUBLICATIONS

EPO, München, DE, European Notice (EPA Form 1507N) and Search Report (EPO Form 1503 03 82) for European Patent Application No. EP 23 17 4649.6, Oct. 19, 2023 (9 pages).

Swiss Federal Institute of Intellectual Property, Bern, Switzerland, Swiss Search Report for CH01030/22, dated Dec. 19, 2022, in the German Language (2 pages).

Swiss Federal Institute of Intellectual Property, Bern, Switzerland, Swiss Search Report for CH00657/22, dated Dec. 5, 2022, in the German Language (2 pages).

EPO, München, DE, European Notice (EPA Form 1507N) and Search Report (EPO Form 1503 03 82) for European Patent Application No. EP 23 17 4650.4, Feb. 15, 2024 (12 pages).

* cited by examiner

DEVICE AND METHOD FOR LOADING PACKAGING UNITS INTO A TRANSPORT CONTAINER

CROSS REFERENCE TO RELATED APPLICATIONS

This patent application claims priority to Swiss Patent Application No. CH000657/2022, filed May 31, 2022; Swiss Patent Application No. CH001030/2022, filed Sep. 2, 2022; European Patent Application No. 23174649.6, filed May 22, 2023, and European Patent Application No. 23174650.4, filed May 22, 2023. The aforementioned priority documents, corresponding to this invention, to which a foreign priority benefit is claimed under Title 35, United States Code, Section 119, and Title 37, United States Code, Section 1.55, and their entire teachings are incorporated, by reference, into this specification.

All the above-referenced applications are hereby incorporated by reference herein in their entirety and are made a part hereof, including but not limited to those portions which specifically appear hereinafter.

BACKGROUND OF THE INVENTION

Field of the Invention

The invention relates to bundles for goods units, methods for producing such bundles, and devices and methods for inserting goods units into a transport container.

Discussion of Related Art

Important topics of intralogistics are, among other things, the provision of goods units and the picking of goods units, i.e., the assembly of different goods units for an order. In this case, there is a need for automation of operations in intralogistics systems.

Conveyor systems having automatically conveyable transport containers have become established in particular with regard to heterogeneous goods units as an efficient solution for automatic storage systems and picking systems. In automated warehouses, spacious production facilities, and generally in the conveying and transport of goods, overhead conveyor systems have proven to be an efficient means of transport, intermediate buffering, but also long-term storage of various types of goods.

In overhead conveyor systems, also known as suspended conveyor systems, the goods are either suspended in a suitable manner directly from individual conveyor members of a conveyor system, or inserted into corresponding transport containers such as transport bags, which in turn are mounted in a suspended manner on the conveyor members. Overhead conveyor systems can be implemented as transport chain installations, in which a large number of conveyor members form links of a chain that is moved along a conveying path. Gravity conveyor systems are also known, in which individual conveyor members move on corresponding running rails. Such gravity-conveyed, rail-guided conveyor systems are known for example from US 2017/275826 A1, US 2018/215547 A1 and US 2017/282317 A1.

Particularly the constantly increasing volumes in online trading require retailers, suppliers and logistics companies to handle the goods to be processed efficiently, particularly in relation to the production, provision and storage of the articles, as well as the commissioning and transport of the articles to the customer. Overhead conveyor systems having transport containers are particularly suitable for efficiently conveying heterogeneous units of goods, such as workpieces in production processes, spare parts, consumer goods like books, clothes, shoes, etc. In logistics centers of mail order companies, for example, overhead conveyor systems can be used to store a large number of units of goods of different sizes and weights, and to pick groups of articles according to the respective customer orders, i.e., to combine them into groups of goods according to specifications, and to provide them for dispatch.

In this description, the term "unit of goods" or "goods unit" or "goods" is used synonymously and may comprise particularly single piece of goods, but also packaged goods such as packages, and in general individually handleable objects.

A relevant aspect for an overhead conveyor system is the simple, smooth and efficient insertion of units of goods into the empty transport members, for example transport bags, and the simple, smooth and efficient removal of the units of goods from the transport members. In this case, manual insertion of the units of goods into the transport members or removal of the units of goods from the transport members allows a flexible handling of different units of goods, but is slow and cost-intensive. Partially or fully automated systems were developed accordingly.

Examples of such automated loading systems and/or unloading systems for transport bags transported in an overhead conveyor system are shown, for example, in EP 2130968 A1, US 2018/072511 A1, US 2018/0208407 A1, EP 2418160 A1, US 2019/0367282 A1, US 2021/0171292 A1, WO 2018/078098 A1, US 2017/0369250 A1 and US 2021/0053763 A1.

In order that transport containers can be filled with goods units efficiently and without disruption, the goods units should have a stable geometry. In the case of goods having poor dimensional stability, such as clothing items, this can be achieved, for example, by packaging them in a plastic film. The use of such plastic packaging is, however, increasingly criticized, on the one hand due to the consumption of valuable resources, and on the other hand due to environmental pollution in the case of unsuitable disposal of the packaging material.

The filling of transport containers with goods units generally has at least one manual work step, namely during the separation of the goods units. Goods units are removed manually from a stack or from a container and individually inserted either directly into provided transport containers or into a corresponding filling device. The use of robot systems is possible, but is less cost-efficient for this purpose.

There is a general need for improvement in this field of technology.

SUMMARY OF THE INVENTION

The object of the invention is to provide a bundle of the type mentioned at the outset, which does not have some of the aforementioned and other disadvantages. In particular, such a bundle is intended to enable goods units to be efficiently inserted into transport containers of a conveyor system of an intralogistics system. Such a bundle should advantageously be inexpensive to produce, and it is intended to require little or no manual work steps in handling.

Another object of the invention is to provide a device and a method for inserting goods units into a transport container. Such a device or such a method should enable a cost-efficient automatic filling of transport containers with goods units.

These and other objects are achieved by a bundle according to the invention, a method according to the invention for producing bundles, and devices according to the invention and methods for inserting goods units into transport containers, according to the independent claims. Further advantageous embodiments and variants are also specified in the dependent claims and the description.

The solution according to the invention can be further improved by various embodiments which are advantageous in themselves and, unless stated otherwise, can be combined with one other as desired. These embodiments and the advantages associated with them are discussed below.

A first aspect of the invention relates to an advantageous bundle for a plurality of goods units. Such an advantageous bundle comprises a carrier strand on which a plurality of packaging units is arranged in series one behind the other.

Such a bundle allows for the packaging units to be conveyed in a controlled manner in the longitudinal direction by conveying the carrier strand and, if necessary, to be provided for further processing without prior separation of the packaging units being necessary. If necessary, a single packaging unit, or also a plurality of packaging units arranged one behind the other, can then be separated from the bundle according to the invention, so that they can be processed further. In particular, the packaging unit can be inserted into a transport container provided.

The carrier strand and/or the packaging unit can be made of plastics material, in particular of a degradable plastics material or a recycled plastics material. Alternatively, carrier strand and/or packaging unit can be produced from paper or cardboard or biological fiber material.

In a bundle according to the invention, at least one goods unit is advantageously arranged in at least one packaging unit of the plurality of packaging units.

The goods units in a packaging unit of such a bundle according to the invention can in particular be dimensionally stable. The goods units can be, for example, garments.

A bundle according to the invention can comprise various types of goods units, for example garments of different sizes and/or different colors.

Alternatively, a bundle according to the invention can also be provided without goods units, in order to be able to insert the goods units into the packaging units at a later point in time.

In a bundle according to the invention, the carrier strand is advantageously band-shaped.

Alternatively, or additionally, the carrier strand is advantageously made of a flexible material in the case of a bundle according to the invention.

In an advantageous embodiment of a bundle according to the invention, in the case of the carrier strand a hinge element is arranged between two adjacent packaging units.

Such hinge elements serve to be able to fold together the carrier strand of a bundle according to the invention in a targeted manner, for example in the manner of a fanfold, which enables a space-saving packaging of such a bundle. In addition, such a bundle according to the invention is flexible, which facilitates automatic conveying.

Alternatively, or additionally, in the case of a bundle according to the invention, a predetermined breaking point or a locally delimited mechanical weak point can be arranged between two adjacent packaging units, in the carrier strand.

A predetermined breaking point simplifies the separation of packaging elements from the bundle, in that the corresponding predetermined breaking points are used to separate a piece of the carrier strand having the packaging unit arranged thereon. A plurality of packaging units arranged one behind the other can also be separated.

A locally limited mechanical weak point can also assume the function of a hinge element.

In a further advantageous embodiment, a bundle according to the invention comprises two or more carrier strands which are arranged in parallel with one another.

Such a configuration of a bundle has the advantage that less material is required than if a carrier strand extends over the entire width between the outermost two carrier strands.

In another advantageous embodiment of a bundle according to the invention, the carrier strand is formed by packaging units connected to one another in a chain-like manner.

Such a bundle has the advantage that no separate carrier strand is required for obtaining a packaging strand.

In a further advantageous embodiment of a bundle according to the invention, the packaging units have a substantially flat first carrier element, on which a goods unit can be fastened or is fastened.

In yet another advantageous embodiment of a bundle according to the invention, the packaging units have two substantially flat carrier elements, between which a goods unit can be or is held in a form-fitting manner.

Advantageously, at least one machine-readable first data element is arranged on the carrier strand, which is logically assigned to the entire bundle or a subset of the packaging units of the bundle.

Such a first data element makes it possible, for example, to obtain a device which processes a bundle by reading out, from the data element, information about the bundle, its packaging units and or the goods units contained therein, so that when a goods unit is inserted into a transport container the identity of the goods unit can be assigned to the corresponding transport container in a database. For example, the type and number of the goods units can be contained in the data element, so that this information does not have to be manually acquired by an operator. This reduces the workload and eliminates possible error sources. It is also possible, for example, for different goods units to be arranged in the same bundle. Thus, for example, a set of different sizes and/or colors, of a specific type of clothing, can be supplied in the same bundle.

A first data element can also contain data which facilitates the correct processing of the bundle. For example, data relating to dimensions and material properties of the individual components of the bundle can be provided. Such details make it possible to accordingly adapt devices which are intended to process different types of bundles.

Alternatively, or additionally, in the case of a bundle according to the invention, machine-readable second data elements can be arranged on the individual packaging units.

The second data elements are logically assigned to the corresponding packaging unit and can be attached to the actual packaging unit or also to the goods unit contained therein.

Alternatively, or additionally, in the case of a bundle according to the invention, a plurality of machine-readable second data elements can be arranged on the carrier strand, one of these second data elements being logically assigned to one packaging unit in each case.

Such second data elements for example can contain information about the goods units which are contained in the corresponding packaging units of the bundle. This can serve, in combination with a first data element, for double control. Furthermore, the sequence of the goods units along the carrier strand can be configured more flexibly since the identification of each goods unit can take place individually.

The first data elements or second data elements of such a bundle according to the invention can have a one-dimensional barcode, a two-dimensional barcode, a text element, a graphics element, and/or an RFID element.

In another advantageous embodiment of a bundle according to the invention, the carrier strand has machine-readable markings for determining the position on the carrier strand.

Such position markings make it possible to ensure the correct orientation of processing devices, for example of modules for separating packaging units from the bundle. Likewise, in this way, individual packaging units or goods units can be identified, in conjunction with data relating to the type and position of goods units on the carrier strand, as can be provided for example in a first data element, without the corresponding packaging units having individual identification data.

In another advantageous embodiment of a bundle according to the invention, the carrier strand has active elements which can interact with conveying modules. The active elements can be designed, for example, as guide holes or lateral notches along the carrier strand.

Such active elements allow the form-fitting interaction of a conveying module with the carrier strand, which allows more precise conveying than, for example, in the case of a force-fitting conveying of the carrier strand.

Advantageously, in the case of a bundle according to the invention, a start element is arranged at a first end of the carrier strand.

Such a start element can for example serve to correctly insert the carrier strand into a processing device. A first data element is advantageously arranged on the start element.

In a container bundle to the invention, a termination element is advantageously arranged at a second end of the carrier strand.

Such a termination element offers the advantage, for example, that it is possible to detect when the regular end of the carrier strand of the bundle is reached. Thus, for example, a premature reaching of an end of the carrier strand can be detected, for example if the latter is previously torn.

In yet another advantageous variant of a bundle according to the invention, the bundle is arranged in a container.

Such a container can be, for example, a box or a packaging box which allows easy transport and simple storage of the bundle.

A second aspect of the invention relates to an advantageous method for producing a bundle from a plurality of goods units. Such an advantageously method comprises the steps of:
  providing a carrier strand;
  providing a plurality of packaging units;
  inserting goods units into the packaging units; and
  attaching the plurality of packaging units along the carrier strand.

A bundle according to the invention is advantageously produced at the location of the production of the goods units.

In an advantageous variant of a method according to the invention, the packaging units are formed from the carrier strand. Such a method has the advantage that a separate carrier strand can be dispensed with.

In another advantageous variant of the method according to the invention, the packaging units are attached to the carrier strand.

In a further advantageous variant of the method according to the invention, the carrier strand is formed by arranging the packaging units one after the other in a row.

In yet another advantageous variant of the method according to the invention, the carrier strand is formed by concatenating the packaging units.

In a method according to the invention, the goods units are advantageously inserted into the packaging units, along the carrier strand, after the packaging units have been attached.

In a method according to the invention, the goods units are advantageously inserted into the packaging units, along the carrier strand, before the packaging units are attached.

The goods units can also be inserted into the packaging units, on the carrier strand, only after the packaging units have been attached. This can take place, for example, substantially directly after the attachment of the packaging units. Alternatively, the bundle can be produced completely without goods units and can be provided for later filling of the packaging units with goods units.

A third aspect of the invention relates to an advantageous device for inserting goods units into a transport container. Such an advantageous device comprises a module for feeding a bundle according to the invention or a bundle produced according to a method according to the invention; a module for separating packaging elements from a fed bundle; and a module for inserting packaging units, separated from the bundle, into a transport container.

Advantageously, such a device according to the invention has a module for identifying bundles and/or packaging units and/or goods units.

The term "identification" is used in connection with this description both for the identification of a specific individual object, for example a unique identification number, and also for the identification of a type of a specific object, for example an article number.

Such an identification module can comprise a reader unit which is provided to read a data element of a bundle or a packaging unit of the bundle. An identification module can also have an evaluation unit which is provided to evaluate the data read in and to use these data for identifying a bundle or a packaging unit.

A device according to the invention advantageously comprises a module for providing transport containers.

For example, such a provision module can be integrated into a conveyor system of an intralogistics system. It can be configured in such a way that transport containers can be supplied in the conveying system, prepared for filling, and subsequently conveyed away again in the conveying system.

In a device according to the invention, the module for providing transport containers is advantageously configured to receive a transport container from a conveyor system and/or to transfer a transport container to a conveyor system.

The conveyor system can in particular be an overhead conveyor system. The transport container can in particular be an overhead conveyor bag.

Advantageously, in a device according to the invention, the module for providing transport containers is designed to receive a transport container in the form of an overhead conveyor bag from an overhead conveyor system, and/or to transfer it to the overhead conveyor system.

In a further advantageous embodiment of a device according to the invention, the module for providing transport containers is designed to transfer a transport container, in the form of an overhead conveyor bag, from a closed state into an open state.

In another advantageous embodiment of a device according to the invention, the module for providing transport containers is designed to align a transport container, in the form of an overhead conveyor bag of an overhead conveyor system, before the goods unit is inserted In such a device according to the invention, the module for providing transport containers is particularly advantageously configured to rotate the overhead conveyor bag from a conveying position into a filling position before the goods unit is inserted.

A device according to the invention for inserting goods units into a transport container is advantageously integrated into a conveyor system of an intralogistics system.

A fourth aspect of the invention relates to a method for inserting goods units into a transport container. Such a method according to the invention comprises the steps of:
- providing a bundle according to the invention or a bundle produced according to a method according to the invention;
- providing a transport container;
- separating at least one packaging unit, which contains at least one goods unit, from the bundle; and
- inserting the at least one separated packaging unit into the transport container.

In such a method according to the invention, the packaging units of the row are advantageously separated from the bundle in sequence, along the carrier strand.

Alternatively, or additionally, in such a method according to the invention, the packaging units can be separated from the bundle and inserted into the transport container in groups of two or more packaging units.

In a method according to the invention, the provided transport container is advantageously a transport container of a conveying system, for example an overhead conveyor bag of an overhead conveyor system.

In an advantageous variant of a method according to the invention for inserting goods units into a transport container, in order to insert the at least one separated packaging unit into a transport container said transport container is stopped in the conveying system and the at least one packaging unit is subsequently inserted into the transport container.

In another advantageous variant of a method according to the invention for inserting goods units into a transport container, in order to insert the at least one separated packaging unit into a transport container said transport container is continuously conveyed in the conveying system, and the at least one packaging unit is inserted into the moving transport container.

Continuous filling has the advantage that higher cycle times can be achieved due to the omitted braking and acceleration processes. A device for automatically filling overhead conveyor bags, while they are conveyed continuously, is known, for example, from US 2018/0208407 A1.

In a method according to the invention, the transport container in the form of an overhead conveyor bag of an overhead conveyor system is advantageously transferred from a closed state into an open state before the goods unit is inserted.

In a method according to the invention, again advantageously the transport container in the form of an overhead conveyor bag of an overhead conveyor system is aligned before the goods unit is inserted.

Particularly advantageously, in this case, the overhead conveyor bag is rotated from a conveying position into a filling position before the goods unit is inserted.

Further aspects of the present invention also emerge from the following description.

BRIEF DESCRIPTION OF SEVERAL VIEWS OF THE DRAWINGS

For improved understanding of the present invention, reference is made below to the drawings. These only show embodiments of the subject matter of the invention and are not suitable for limiting the invention to the features disclosed herein. The same or similar reference signs are used in the following figures and the corresponding description for identical or similar elements.

DETAILED DESCRIPTION OF THE INVENTION

Figure 1:
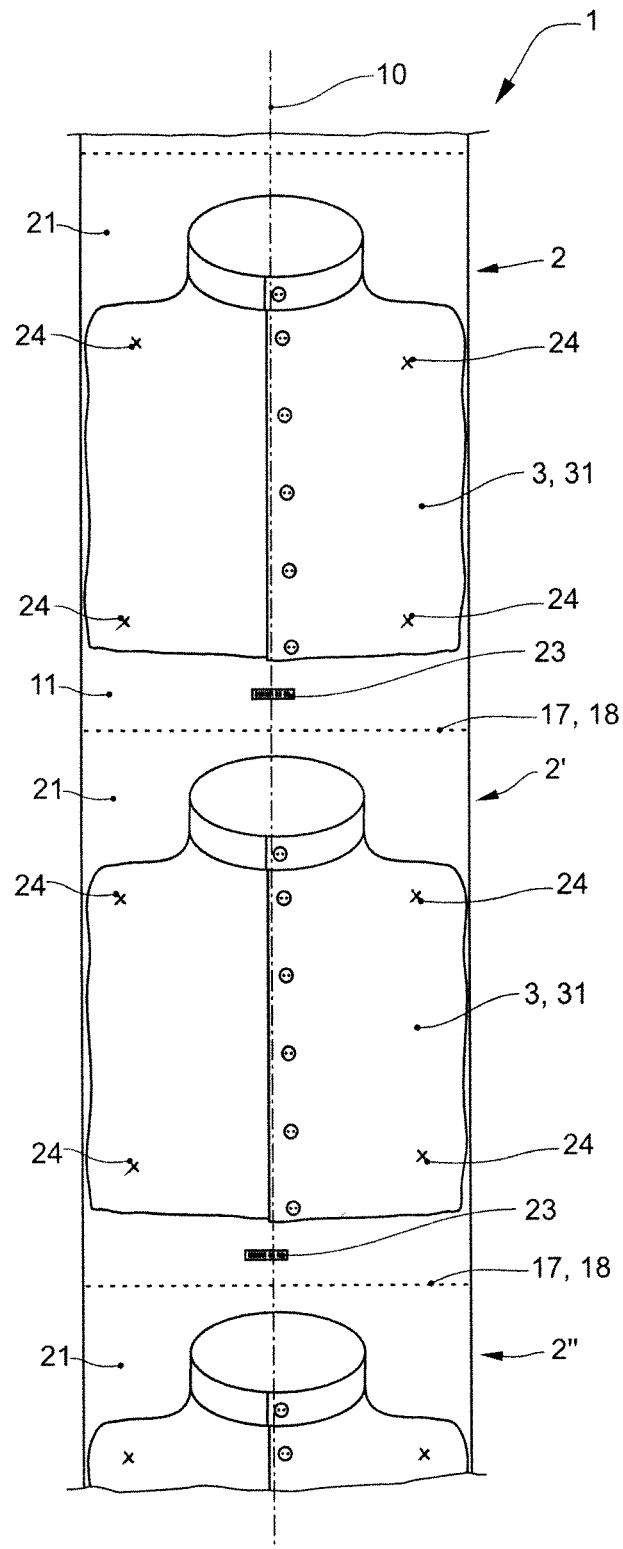
FIG. 1 shows a schematic plan view of an embodiment of a bundle according to the invention.

A possible embodiment of a bundle 1 according to the invention is shown in FIG. 1. The bundle 1 comprises a carrier strand 11 in the form of a flat strip or band which defines a longitudinal direction 10. The carrier strand 11 is made of a material which has a certain mechanical stability. In this case, the mechanical stability must be sufficient to ensure that a packaging unit 2, 2', 2" separated from the carrier strand 11 can stand perpendicularly on a longitudinal edge or transverse edge, without the packaging unit folding or collapsing under the own weight of the packaging unit and the goods unit arranged therein.

In the example shown, for example, thin cardboard can be selected as the material for the carrier strand 11, which material is provided for example as a continuous web from a roll. Alternatively, another suitable material can also be selected, such as a plastics film having suitable stiffness, in such a case a biodegradable material advantageously being selected.

Figure 13:
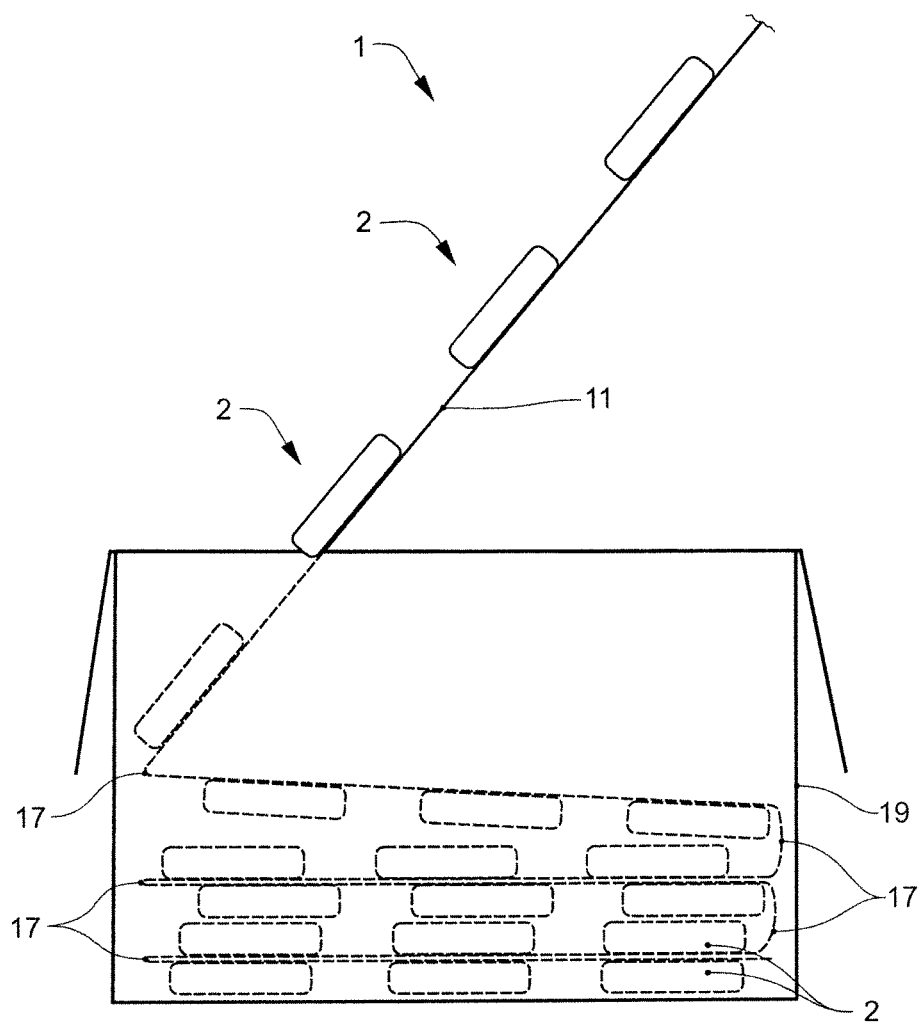
FIG. 13 shows a schematic cross section of a bundle according to the invention in a container.

The carrier strand 11 has perforations 17 transversely to the longitudinal direction at regular intervals. These perforations divide the carrier strand 11 functionally into a plurality of packaging units 2, 2', 2", each having a flat carrier element 21. At the same time, local weaknesses of the mechanical stability of the carrier strand are formed along the perforations 17. The perforations therefore act as hinge elements, at which adjacent carrier elements 21 of the carrier strand 11 are pivotable relative to one another. This makes it possible for the bundle 1 to be able to be flexibly deflected perpendicularly to the longitudinal direction 10 and to the perforation 17, analogously to a chain. In this way it can for example be conveyed using a suitable device, as will be discussed below in conjunction with FIG. 18. It can also be accommodated in a space-saving manner in a container, as shown in FIG. 13.

The perforations can additionally also be used as predetermined breaking points 18 in order to separate a packaging unit 2 from the remaining bundle 1, as required. Such isolated packaging units 2, 2', 2" can then be inserted, for example, into a transport container of a conveying system without the goods unit being damaged or impaired in quality. For example, such a packaging unit can be inserted into an overhead conveyor bag of an overhead conveyor system.

A goods unit 3 in the form of a shirt 31 folded flat in a conventional form is arranged on each packaging unit 2, 2', 2". The goods units 3, 31 are connected to the carrier element 21 of the packaging unit 2, 2', 2" at four fastening points 24. For example, the shirt can be sewn onto the four fastening points 24 by a thread, or be attached to the packaging unit by means of a pin, or connected thereto in some other form-fitting manner.

It is also possible to use correspondingly suitable clamping elements which clamp the shirt 31 and the carrier element 21 of the packaging unit 2 together in a force-fitting manner via lateral edges, for example.

The stiffness of the entire combination of the packaging unit 2 and the goods unit 3 also contributes to the effective mechanical stability of the packaging unit. For a goods unit which already has a certain mechanical stability, the material of the carrier strand 11 can thus be selected to be thinner, for example.

In the example shown, in addition to the resulting mechanical stability of the packaging unit, the packaging unit 2 additionally has the effect that the edges of the goods units are protected during conveying and storage of isolated packaging units.

In the embodiment shown, data elements 23 in the form of optically readable barcodes are arranged on the carrier elements 21 of the packaging units. Alternatively, other data elements can also be used, such as two-dimensional QR codes or RFID elements. The data elements 23 can contain, for example, information on the type of the goods unit 3 contained in the packaging unit 2, data on the production sequence, such as batch number, date of production and production location, an individual identification number, or a reference to an entry in a database.

The data element 23 can, for example, be attached to the packaging unit 2 when the goods unit 3 is inserted. Alternatively, the data element 23 can be attached to the carrier element 21 independently of the goods unit 3, and later described with data in the production sequence. Corresponding data can also be assigned to a unique identification number in a database.

Figure 2:
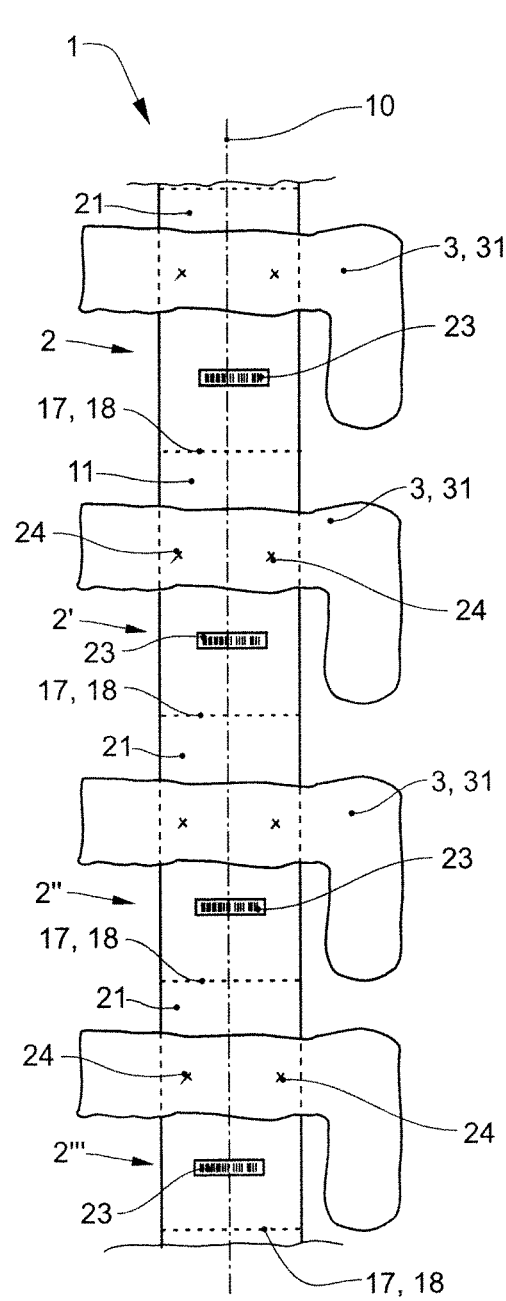
FIG. 2 shows a schematic plan view of another embodiment of a bundle according to the invention.

Another advantageous embodiment of a bundle 1 according to the invention is shown in FIG. 2. The carrier strand 11 is in turn designed in the so as to be band-shaped or strip-shaped, and is divided by perforating strips 17 into individual packaging units 2, 2', 2", 2'" having flat support elements 21. A goods unit 3 in the form of a pair of socks 31 is attached to each of the carrier elements 21 of the packaging units at two fastening points in each case, for example by sewing onto the carrier element 21.

For goods units 3 such as the socks 31 shown, the risk of mechanical damage during insertion into a transport container 8 is fairly low. A bundle according to the invention is nevertheless advantageous for this, because it allows a very efficient provision of the goods units for later filling into transport containers of an intralogistics system.

Typically, goods units 3 are individually packaged during production and these isolated packaging units are in turn packed into a transport container, with which they then reach the processor, for example a mail order center, from the manufacturer. There, they are removed from the transport container and separated, manually or with special apparatuses adapted to the products, for further processing. By contrast, in the case of a bundle according to the invention, the goods units can already be inserted into the packaging units 2 of a bundle 1 according to the invention at the manufacturer, in the continuous production process. The resulting bundle can then be packaged and transported integrally. In the main order center, the bundle 1 can then be easily transferred into individual packaging units 2, which can then be transferred into transport containers of an overhead conveyor system for example.

It is also possible to provide bundles in flexible sizes, by producing the bundle as a continuous chain, from which bundles having the desired number of goods units are then separated.

For goods units 3 in which the mechanical stability of the packaging unit is secondary, it is possible, as explained above, for the carrier strand 11 to also be manufactured from a flexible material, for example as a flexible strip made of paper, plastics material or textile sheet material.

Figures 3, 4:
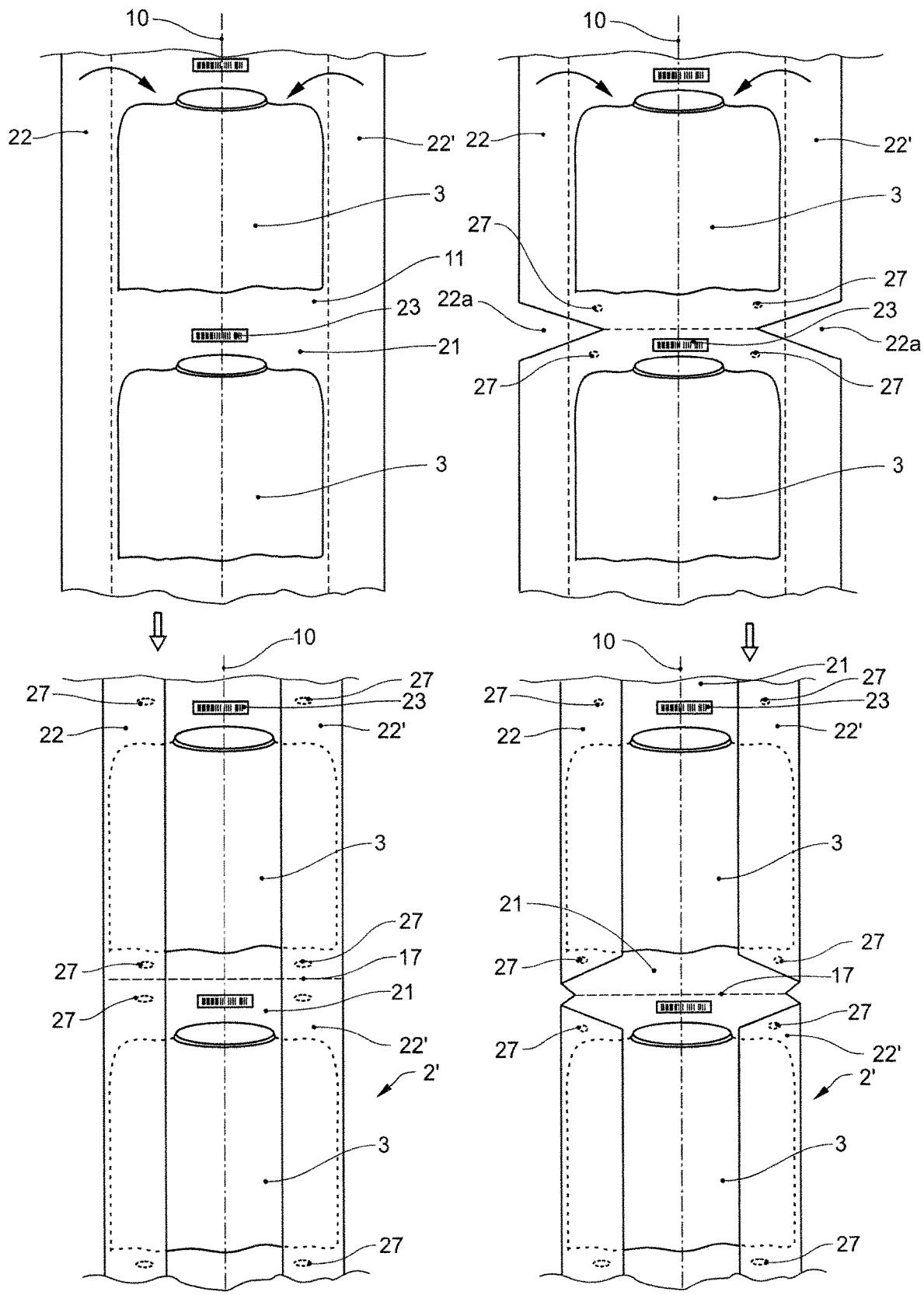
FIG. 3 shows a schematic plan view illustrating the production of a further embodiment of a bundle module according to the invention, FIG. 4 schematically shows the production of the packaging units in a variant of a bundle according to the invention.

An alternative embodiment of a bundle according to the invention, and the production thereof, is shown in FIG. 3. In order to produce the container 1, a web 11 made of a suitable material, for example paper of suitable thickness, is provided from the roll. The goods units 3, in the example shown a T-shirt or pullover 31, are deposited on a middle strip 21' of the carrier strand 11. The outer edges 22, 22' of the carrier strand 11 are then folded forward, towards the inside, such that the folded outer edges 22, 22' come to lie on the goods unit 3. The outer edges are connected to the central region of the carrier strand 11 lying underneath, for example by gluing or ultrasonic welding, at four connecting points 27.

The goods unit 3, 31 is now held in a form-fitting manner between a rear carrier element 21, which is formed by the original central region of the carrier strand 11, and the second carrier elements 22, 22', which are formed by the folded-over original edge regions of the carrier strand 11.

The perforation line 17 transversely to the longitudinal direction 10 of the carrier strand 11 can either be attached before the outer edges 22, 22' are folded over, or advantageously only after first and second carrier elements 21, 22, 22' are connected.

Since the folded longitudinal edge and the double-layer carrier elements 21, 22, 22' increase the mechanical stiffness compared with the single-layer carrier element 21 from FIG. 1, the material thickness of the carrier strand can be reduced or adapted to the goods unit.

In another variant of such a bundle 1 according to the invention, the production of which is shown in FIG. 4, cutouts 22a are made at the later connection points of the adjacent packaging units in the edge strips 22, 22' which are not yet folded over, which cutouts extend over the entire width of the second carriers 22, 22' and, if necessary, can also extend into the region of the first carrier 21, as shown. The perforation line 17 is arranged between the two cutouts 22a. Adhesive points 27 are provided on the second carrier elements 22, 22'. Such a variant has, inter alia, the advantage that the second carrier elements 22, 22' can better adapt to the shape of the goods unit 3, since the second carrier elements 22, 22' are not continuous in the longitudinal direction.

In a further variant of such a bundle according to the invention, an additional strip can be formed in each case between the two edge regions (the later second carrier elements) and the central region (the later first carrier element) of the carrier strand, which strip forms an outer wall when the packaging unit is completely folded together. In such an embodiment, a certain basic distance between the first and second carrier elements is provided, which is advantageous especially in the case of thicker goods units.

The edge regions 22, 22' can also be designed to be substantially wider than shown, so that after folding over the second carrier elements 22, 22' the front side of the packaging unit is closed.

It is also possible to deposit a second web, for example a transparent film, on the goods units 3 before the second carrier elements 22, 22' are folded over, so that the finished packaging unit is also completely closed at the front. This second web does not have to be connected to the carrier strand 11, since it is held in a form-fitting manner when the bundle is dimensioned appropriately.

Figure 5:
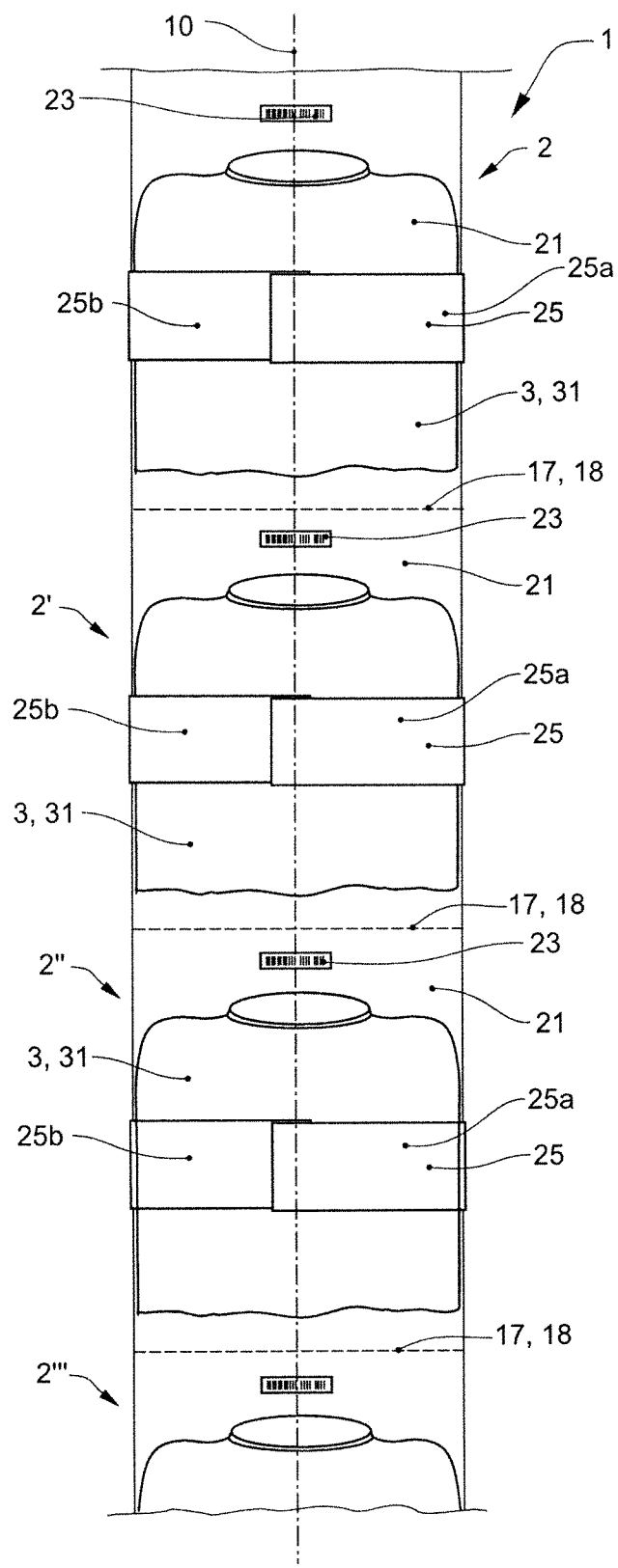
FIG. 5 shows a schematic plan view of yet another embodiment of a bundle according to the invention, in which the goods units are fastened to the bundle by means of bands.

FIG. 5 shows an embodiment of a bundle 1 according to the invention, in which goods units 3 in the form of pullovers or T-shirts 31 are arranged on a single-layer carrier strand 11. In this case, the goods unit is fastened via a band 25. For this purpose, a band strip is fastened to the carrier strand 11 (not shown), and the two tabs 25a, 25b are closed on the front side above the goods unit 3, for example by gluing the tab ends.

Alternatively, the band can also be designed to be continuous on the front side, above the goods unit 3, in such a case the two ends of the band strip being folded around the carrier strand 11 and fastened on the carrier strand 11 on the remote rear side.

Figure 6:
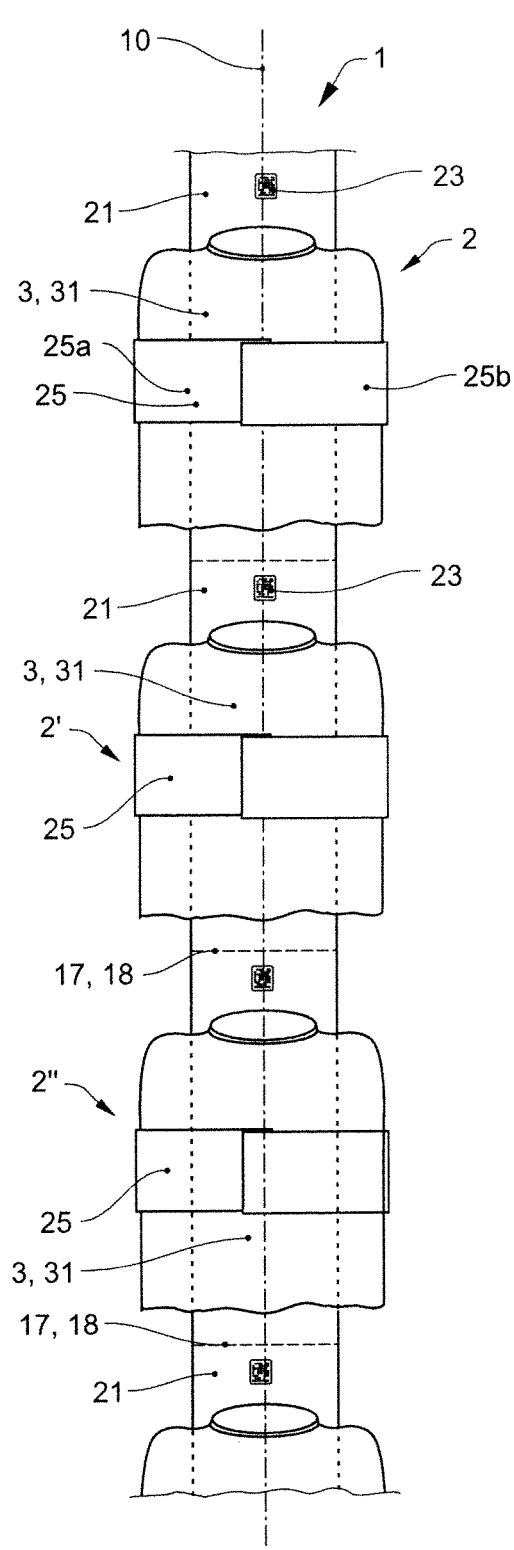
FIG. 6 shows a schematic plan view of a further embodiment of a bundle according to the invention, in which the goods units are fastened to the bundle by means of bands, FIG. 7($a$) schematically shows an embodiment of a bundle according to the invention having two-layer packaging units in plan view, FIG. 7($b$) schematically shows an embodiment of a bundle according to the invention having two-layer packaging units in a side view, FIG. 8($a$) schematically shows an embodiment of a bundle according to the invention having bands formed from the carrier strand for fastening the goods units in plan view, FIG. 8($b$) schematically shows an embodiment of a bundle according to the invention having bands formed from the carrier strand for fastening the goods units in a section along the longitudinal direction.

The carrier strand 11 can also be designed narrower than the goods unit 3, as shown by way of example in the variant in FIG. 6.

Figure 7A:
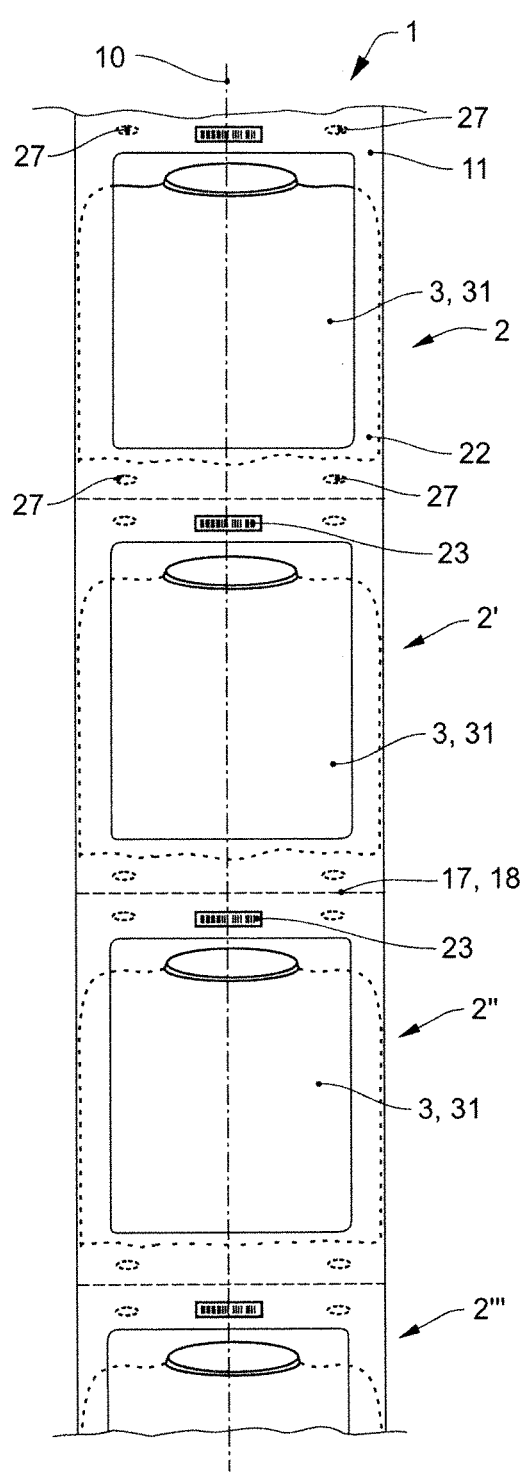
Figure 7B:
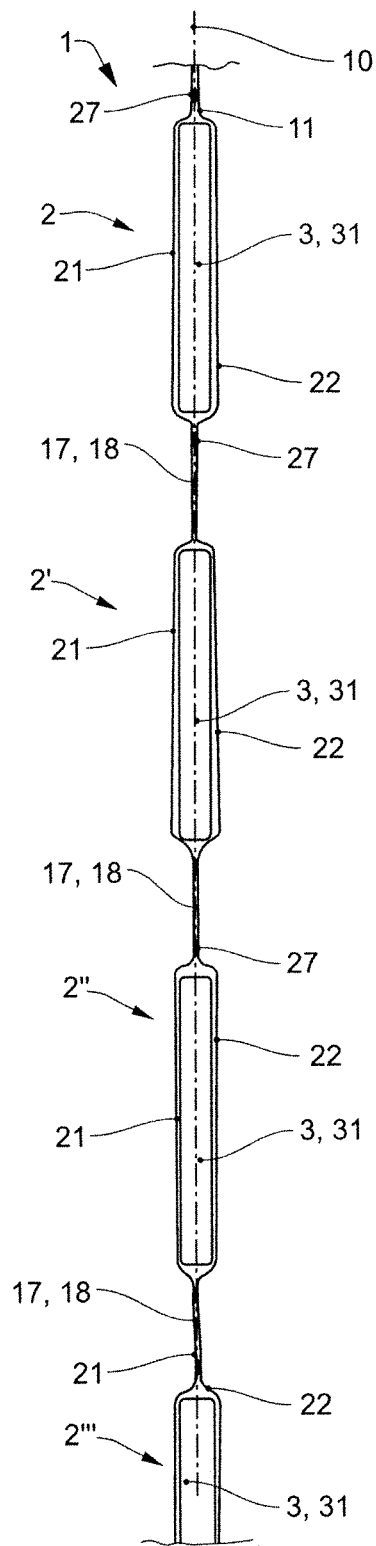

Another variant of a bundle 1 according to the invention, having a two-layer configuration of the packaging units 2, is explained with reference to FIG. 7. The first carrier element 21 made of a suitable flexible material is provided horizontally from the roll. Product units 3, for example in the form of pullovers or T-shirts 31, are arranged on the first carrier element 21 at regular intervals. A second support element 22 is placed thereon, which is also provided from a roll.

At four connection points 27 per packaging unit 2, 2', 2'', 2''', the first carrier element 21 and the second carrier element 22 are connected to a carrier strand 11 so that the goods units 3 are fixed in a sandwich-like and form-fitting manner between the two carrier elements 21, 22. A perforation line is attached as a hinge element 17 and predetermined breaking point 18 between adjacent packaging units 2', 2', 2'', 2''' in each case.

In the embodiment shown, a viewing window through which the goods unit 3 is visible is cutout in the second carrier element 22. This viewing window can alternatively also be omitted, or a transparent film can be arranged in the in the viewing window. This film can be fixed, for example, on the inside of the second carrier element 22. However, since the transparent film is fixed in a form-fitting manner within the packaging unit in the case of suitable dimensioning, it can also be placed only on the goods unit.

The two carrier elements 21, 22 are manufactured from a suitable material, for example paper, which is provided in a band-shaped manner.

Figure 8A:
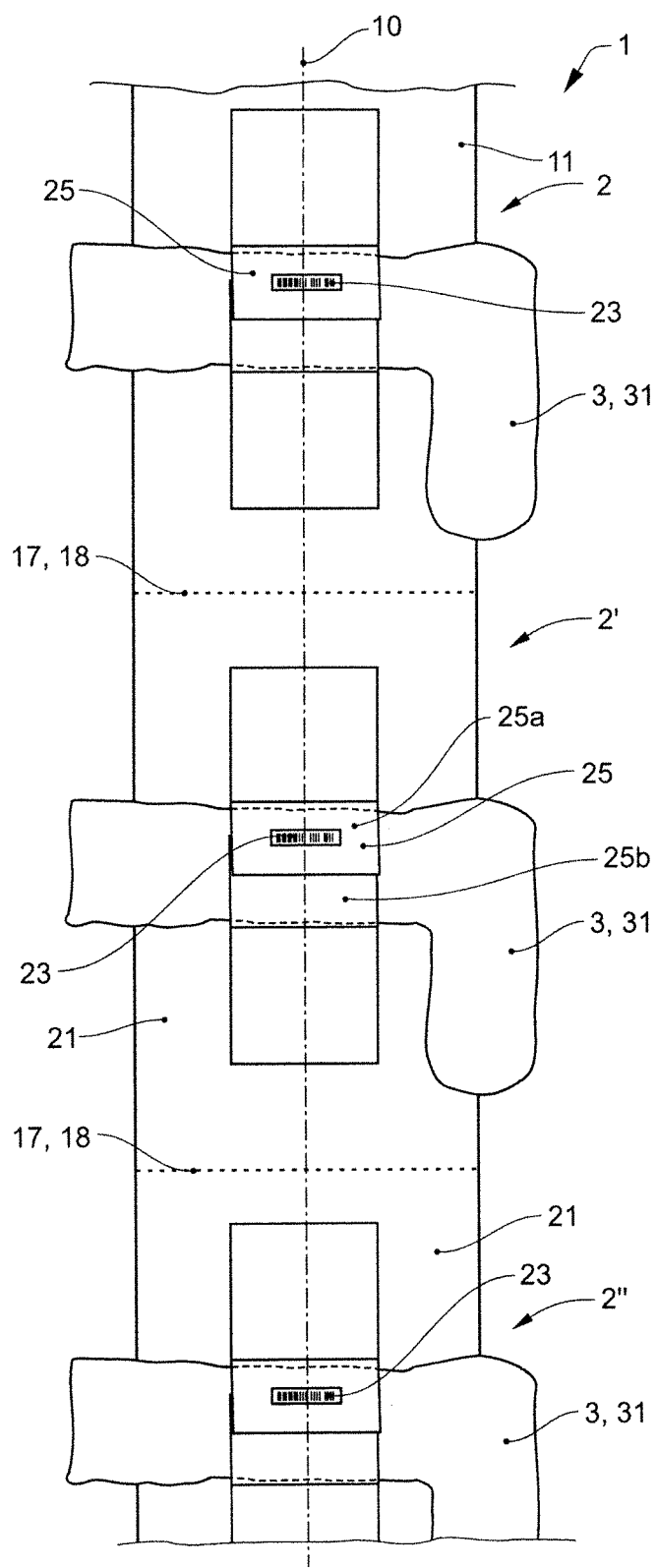
Figure 8B:
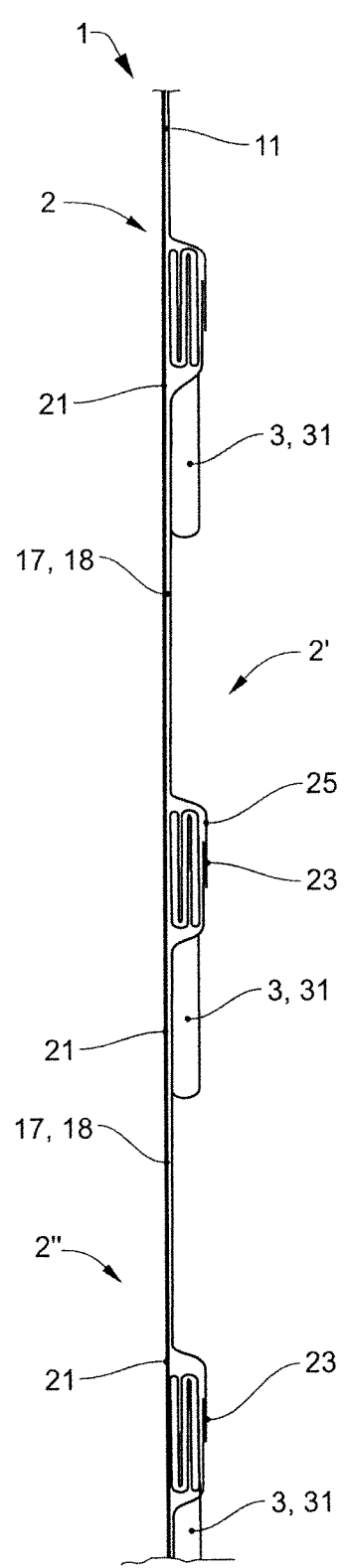

An advantageous embodiment of a bundle 1 according to the invention is discussed on the basis of FIG. 8, in which the goods units 31 are again fastened to the carrier strand 11 by means of bands 25 formed on the carrier strand 11. In this case, the bands are formed from the carrier strand 11 itself.

In order to produce such a bundle 1, two tabs 25a, 25b are punched out of the carrier element 21 of each packaging unit 2 in the provided band-shaped carrier strand 11, along three sides of a rectangle in each case. After the placement of the goods unit 3, in the example shown a pair of socks 31, in an inner region between the two tabs 25a, 25b, the two tabs 25a, 25b of the band 25 are folded over towards the inner region, around the goods unit 3, and glued to a band 25. A second data element 23 is then also attached to the finished band 25. Again, perforation lines are attached, as predetermined breaking points 18 and/or hinge elements 17, between adjacent packaging units 2, 2', 2'', 2'''.

Figure 9:
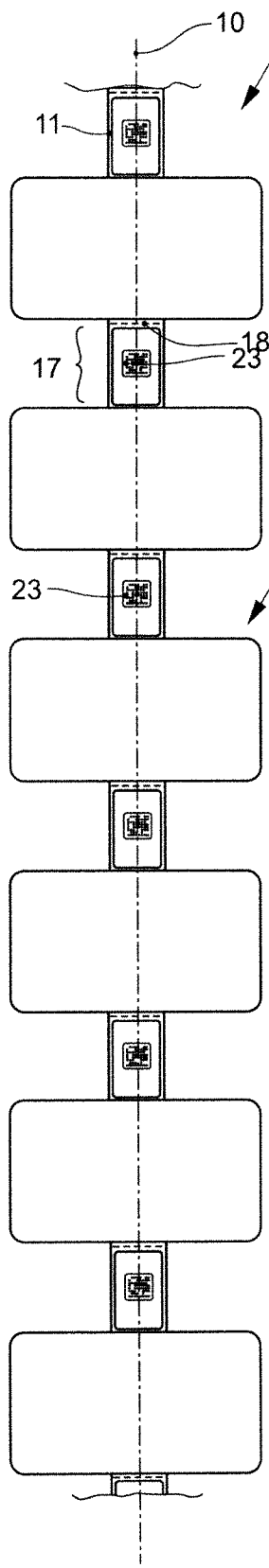
FIG. 9 shows a schematic plan view of an embodiment of a bundle according to the invention having second data elements on the carrier strand between adjacent packaging units.

Instead of creating the packaging units 2, 2', 2'', 2''' of a bundle 1 according to the invention from the carrier strand 1, as in the preceding examples, the packaging units can also be produced separately and then attached to the carrier strand 11 in order to thereby create a bundle 1 according to the invention. For example, FIG. 9 shows such an example of a bundle according to the invention. Packing units 2, 2', 2'', 2''' are fastened on a narrow strip-shaped carrier strand 11. In the gaps between the packaging units, second data elements 23 in the form of a two-dimensional QR code are arranged in each case on the carrier strand 11.

Said packaging units 2, 2', 2'', 2''' are configured as packages in which the goods units (not visible) are arranged.

Such bundles according to the invention are particularly advantageous for packaging units or goods units of limited size and weight, for example smaller domestic articles, cosmetics, electronic devices and data carriers, but also for example medicaments or replacement parts. For such goods, a bundle 1 according to the invention is advantageous due to the significantly lower technical effort of the automatic handling and the separation of the goods.

In order to create a bundle 1 according to the invention, the finished packaging units 2, 2', 2", 2'", including contents, are advantageously fastened, for example glued or welded, to the carrier strand 11 provided as a continuous belt. The at least one corresponding connection point is not visible in the plan view of the figure.

Since the packaging units 2, 2', 2", 2'" are already sufficiently mechanically stable, the carrier strand 11 can be designed to be flexible. In such a case, the entire portion of the flexible carrier strand 11 between two adjacent packaging units acts as a hinge element 17. In the example shown, a predetermined breaking point 18 is also assigned to the carrier strand 11 of each packaging unit 2. However, this can alternatively also be omitted. For example, for separating a single packaging unit, the relative narrow carrier strand 11 between two packaging units can be simply cut through.

Alternatively, it is also possible to release the connection between the carrier strand and packaging units in another manner, for example by conveying a packaging unit in a laterally supported manner, and at the same time pulling away the carrier strand downwards, so that the packaging unit is peeled off or torn off from the carrier strand. The carrier strand that is no longer required can then be used again or recycled.

Instead of as a mechanically stable object, the packaging units can also be designed as bags, for example.

Figure 10:
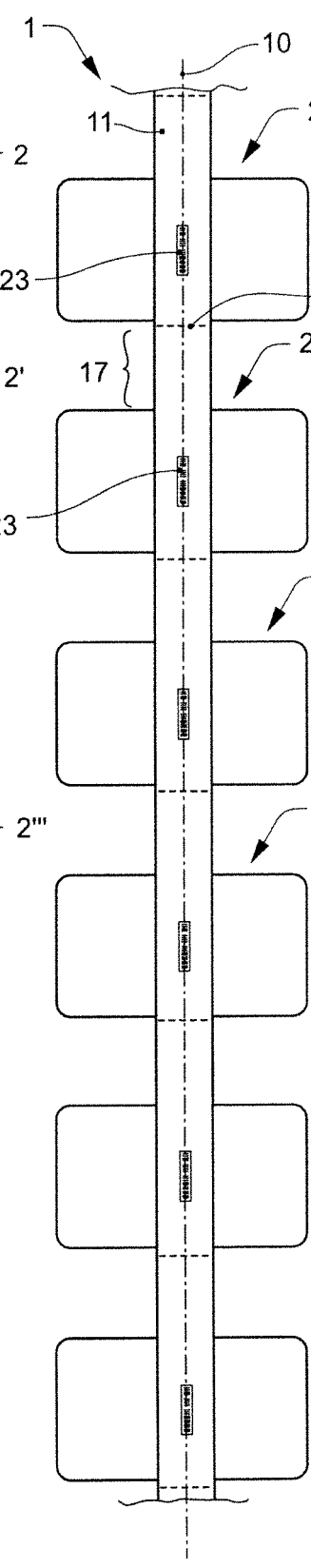
FIG. 10 shows a schematic view from below of an embodiment of a bundle according to the invention having second data elements on the rear side of the carrier strand.

Alternatively, or additionally, second data elements 23 can also be provided on the rear side of the carrier strand 11, as shown by way of example in FIG. 10.

Figure 11:
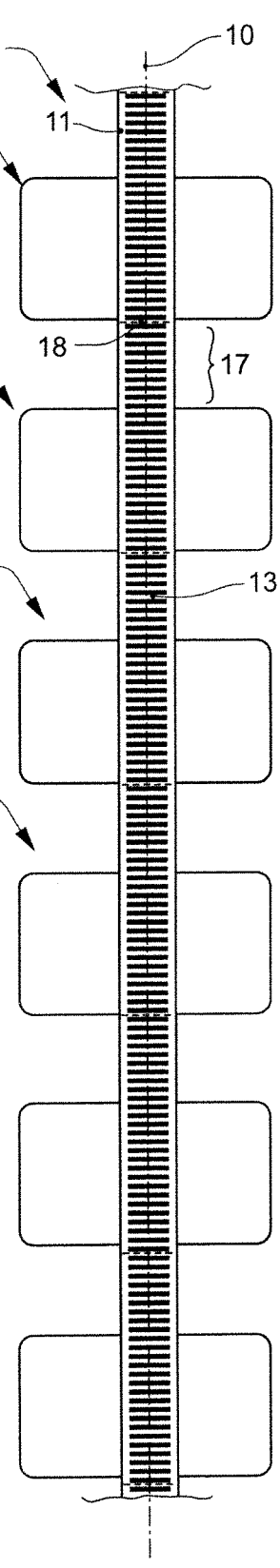
FIG. 11 shows a schematic view from below of an embodiment of a bundle according to the invention having position markings on the rear side of the carrier strand.

FIG. 11 shows a bundle 1 according to the invention analogous to FIG. 9, in which position markings in the form of a line pattern are attached on the rear side of the carrier strand 11. By registering and counting the line markings using a suitable sensor during conveying of the bundle 1 along the longitudinal direction 10, the current position in relation to the entire carrier strand can thus be determined.

The variant shown in the aforementioned figures, having functionally separate packaging units and carrier strand, can also be used for larger packaging units. In this case, without disadvantageous influence on the intended use, the carrier strand can be designed in a material-saving manner, in that the carrier strand is formed in two parts or in multiple parts.

Figure 12:
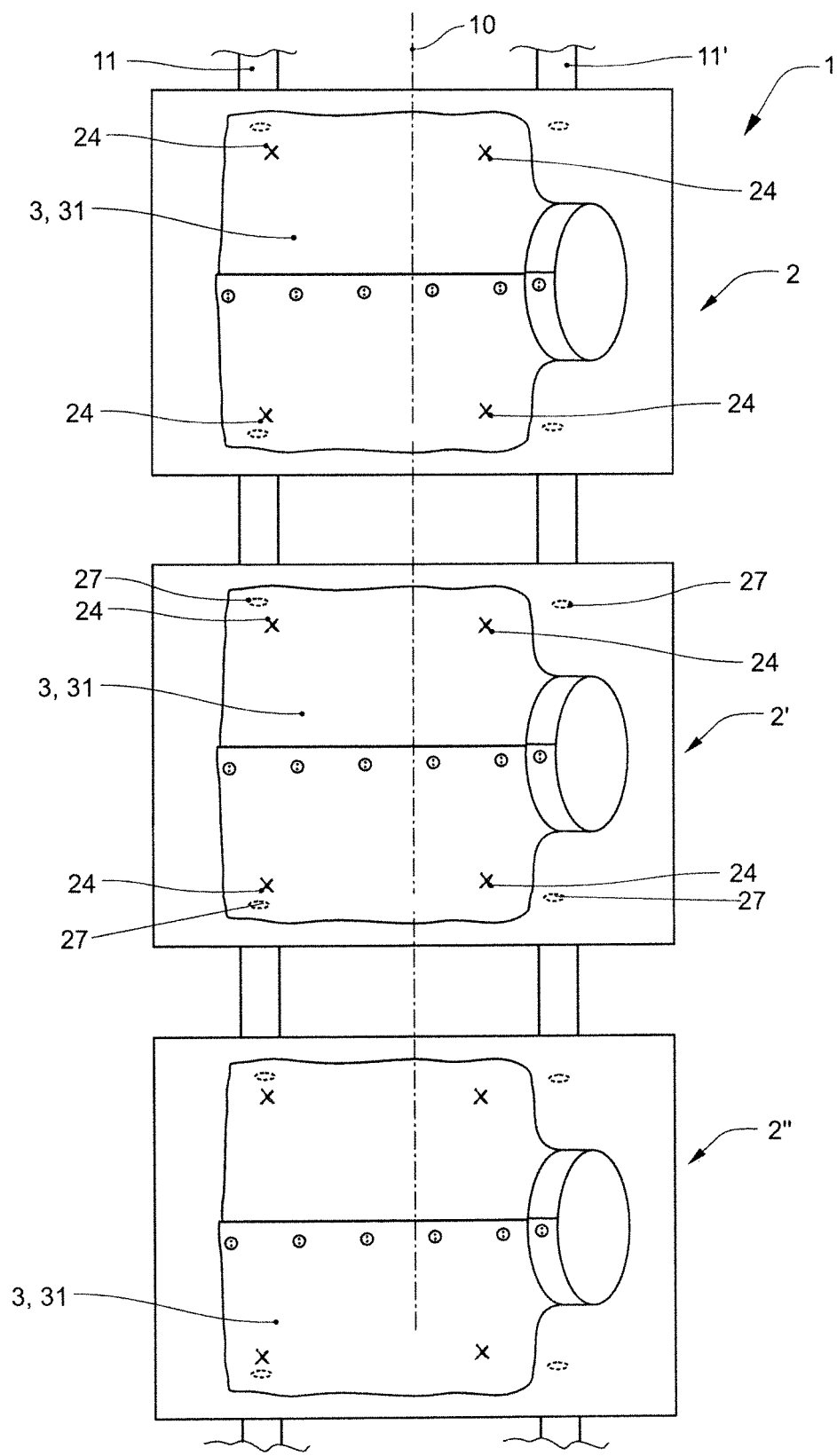
FIG. 12 shows a schematic plan view of an embodiment of a bundle according to the invention having two parallel carrier strands.

Such a variant of a bundle 1 according to the invention is shown in FIG. 12. Two strip-shaped carrier strands 11, 11' are guided in parallel with a longitudinal direction 10. A packaging unit 2, 2' is connected in each case to the carrier strands 11, 11' at four connection points 27.

In the example shown, the packaging units 2, 2' comprise a mechanically stable carrier element 21, on which a goods unit 3 in the form of a shirt 31 is reversibly fixed at four fastening points. Alternatively, the packaging units can also be designed as packages, bags or other closed containers.

The embodiment of a bundle 1 according to the invention shown in FIG. 12 is particularly suitable for mechanically releasing the packaging units 2, 2' from the carrier strands 11, 11' again. For example, the packaging units of a fed bundle can be placed on one or more horizontal belt conveyors extending in parallel with the longitudinal direction 10. If the carrier strands 11, 11' are then guided away from the belt conveyor downwards, the carrier strands tear away from the packaging unit at the connection points 27. The now isolated packaging unit can be conveyed further on the belt conveyor, in order, for example, to be inserted subsequently into a ready transport container of an intralogistics conveyor system.

In addition to the simplified conveying, bundles 1 according to the invention also have the advantage that they are efficiently stored in a transport container 19 for transport from the manufacturer to an intralogistics system, and can subsequently also be removed again in an automated manner for further use, which is explained with reference to FIG. 13.

A bundle analogous to FIG. 9 is stored in a container 19 in the form of a cardboard box, in that the bundle 1 is deposited in layers in the manner of a fanfold. The bundle 1 is then removed from the transport box 19 in the reverse sequence.

The mass of the packaging units 2, the box 19 and the distances of the packaging units from one another on the carrier strand 11 are advantageously matched to one another in such a way that the highest possible packing density is achieved. Advantageously, the packaging units of one layer are each supported on the packaging units of the underlying layer.

Figures 14, 15:
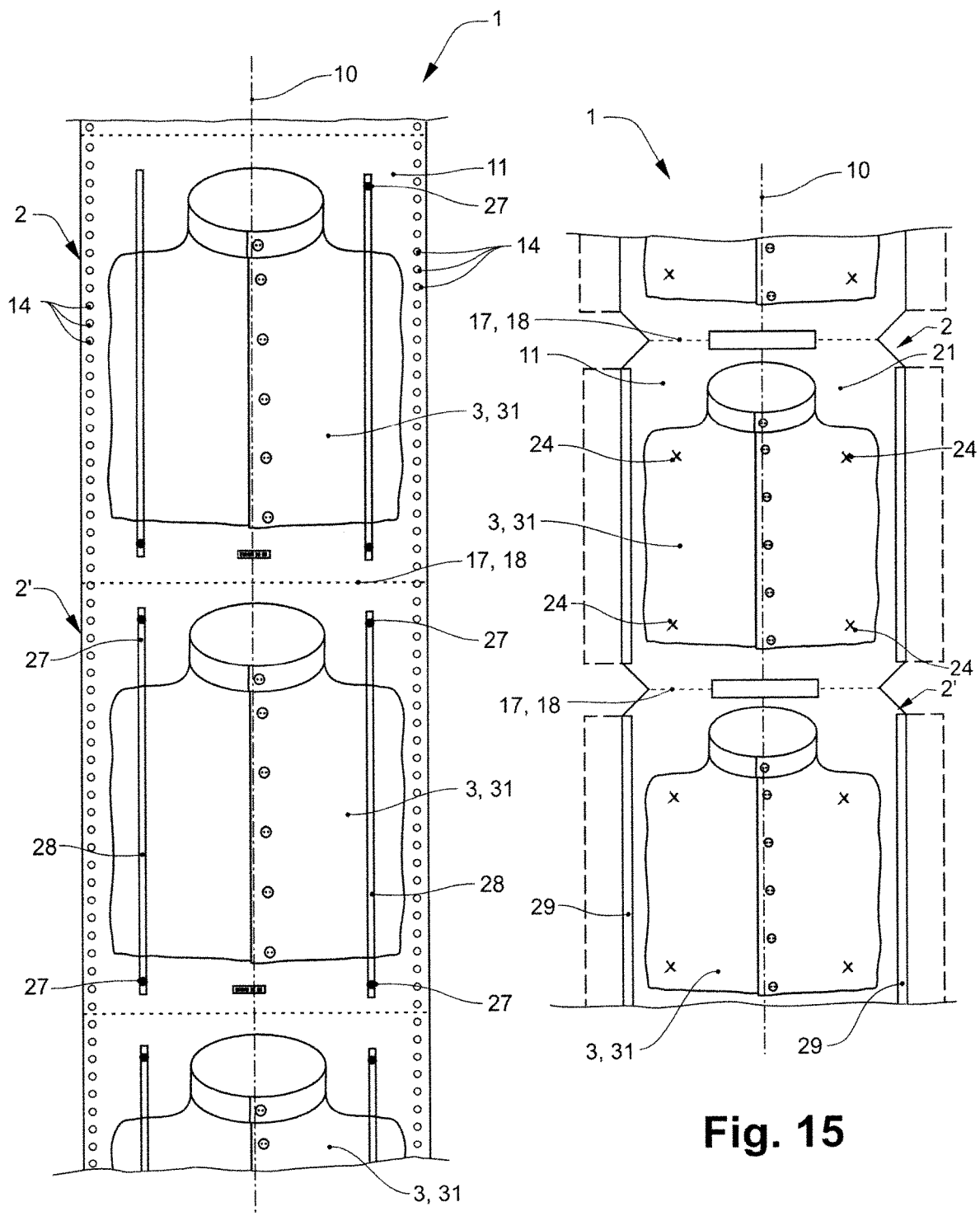
FIG. 14 shows a schematic plan view of a further bundle according to the invention having lateral punched strips.
FIG. 15 shows a schematic plan view of another bundle according to the invention having lateral stiffening elements.

Another embodiment of a bundle 1 according to the invention is shown in FIG. 14. Product units 3 in the form of shirts 31 are arranged on a carrier strand 11, which is designed analogously to FIG. 1 as an integral chain of individual carrier elements 21 separated from one another by predetermined breaking points 18. In this case, the goods units are fastened to the carrier element 21 by clamping elements 28. Such clamping elements can be designed, for example, as resilient, stretched bands, for example resilient cords or resilient rod-shaped elements, which are connected to the carrier element 21 at connection points 27.

Functionally independently of this variant of the fastening of the goods units 3 on the carrier elements 21 of the packaging units 2, the carrier strand 11 is provided on the outer edges with conveying active elements in the form of punched strips 14. Corresponding conveying means, for example in the form of needle wheels, can come into operative connection with these punched strips, in order to ensure precise and reliable conveying of the bundle 1 along the longitudinal direction 10.

Yet another variant of a bundle 1 according to the invention can be seen in FIG. 15. The carrier strand 11 is again configured as a chain of packaging units 2 connected to one another at perforation lines 17. A rectangular recess, which can be produced, for example, by punching out, is provided in the center of the perforation line 17, in the material of the carrier strand 11 or the carrier elements 21. This leads to a further mechanical weakening of the connection point of the packaging units, which can be used to optimize the function of the hinge element 17 or the predetermined breaking point 18. At the edges, triangular recesses are provided, which have the same effect.

In order to be able to minimize the material thickness of the carrier strand 11 and nevertheless achieve the necessary mechanical stiffness of the carrier element 21, stiffening elements 29 are arranged on the outer edges of the carrier elements 21. These are produced in that a corresponding lateral portion of the carrier strand 11 (shown in dashed lines) is provided with adhesive and rolled up from the outside towards the inside, to form a thin but rigid tube 29.

Alternatively, such a stiffening element can also have a triangular or square cross section. Instead of an adhesive connection, form-fitting fixations can also be provided, such as, for example tuck-in tab connections.

Figure 16:
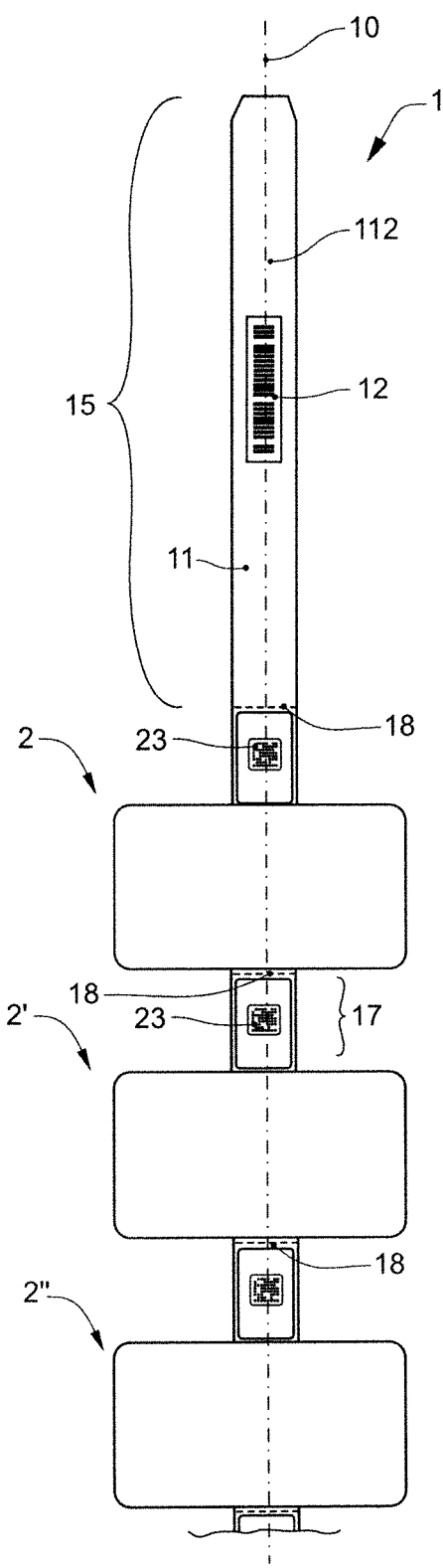
FIG. 16 shows a schematic plan view of a bundle according to the invention as shown in FIG. 9, having a start element at the first end of the carrier strand.

FIG. 16 shows a possible embodiment of an initial region 112 of the bundle 1 according to the invention from FIG. 9. A start element 15 is provided at the first end 112, in the form of a portion of the carrier strand 11 without packaging units.

The tip of the start element 15 is tapered in order to facilitate the insertion of the start element 15 into a processing or conveying device.

A first data element 12 in the form of a one-dimensional barcode is arranged on the start element 15. This first data element 12 is logically assigned to the entire bundle and can, for example, contain information on the length of the bundle, the type and number of packaging units, the goods units contained therein, their position with respect to the carrier strand, etc. It is also possible to provide data therein that allow a processing device to adapt to the specific bundle and adjust the machine settings and process parameters accordingly. In this way, it is possible to realize a processing device, such as a device 6 according to the invention for inserting goods units into a transport container, such that it can process more than one type of bundles 1 according to the invention. In this case, the correct adjustment can take place automatically so that different kinds and types of bundles 1 according to the invention can be processed as far as possible without manual changeover work and with minimal idle times.

Figure 17:
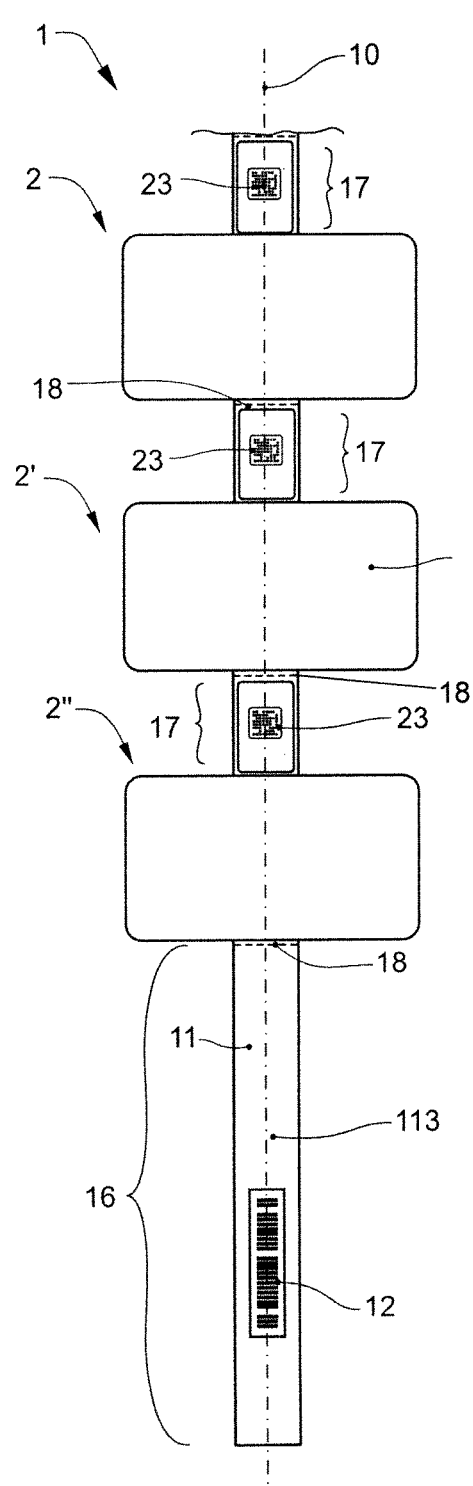
FIG. 17 shows a schematic plan view of a bundle according to the invention as shown in FIG. 9, having a termination element at the second end of the carrier strand.

A termination element 16 can be provided analogously at a second end 113 of a bundle 1 according to the invention, as shown in FIG. 17. Such a second data element 12 makes it possible, for example, to indicated the end of the bundle 1. It can also contain information which allows the verification of the bundle 1 just processed, in order, for example, to be able to discover and correct processing errors in a timely manner.

Figure 18:
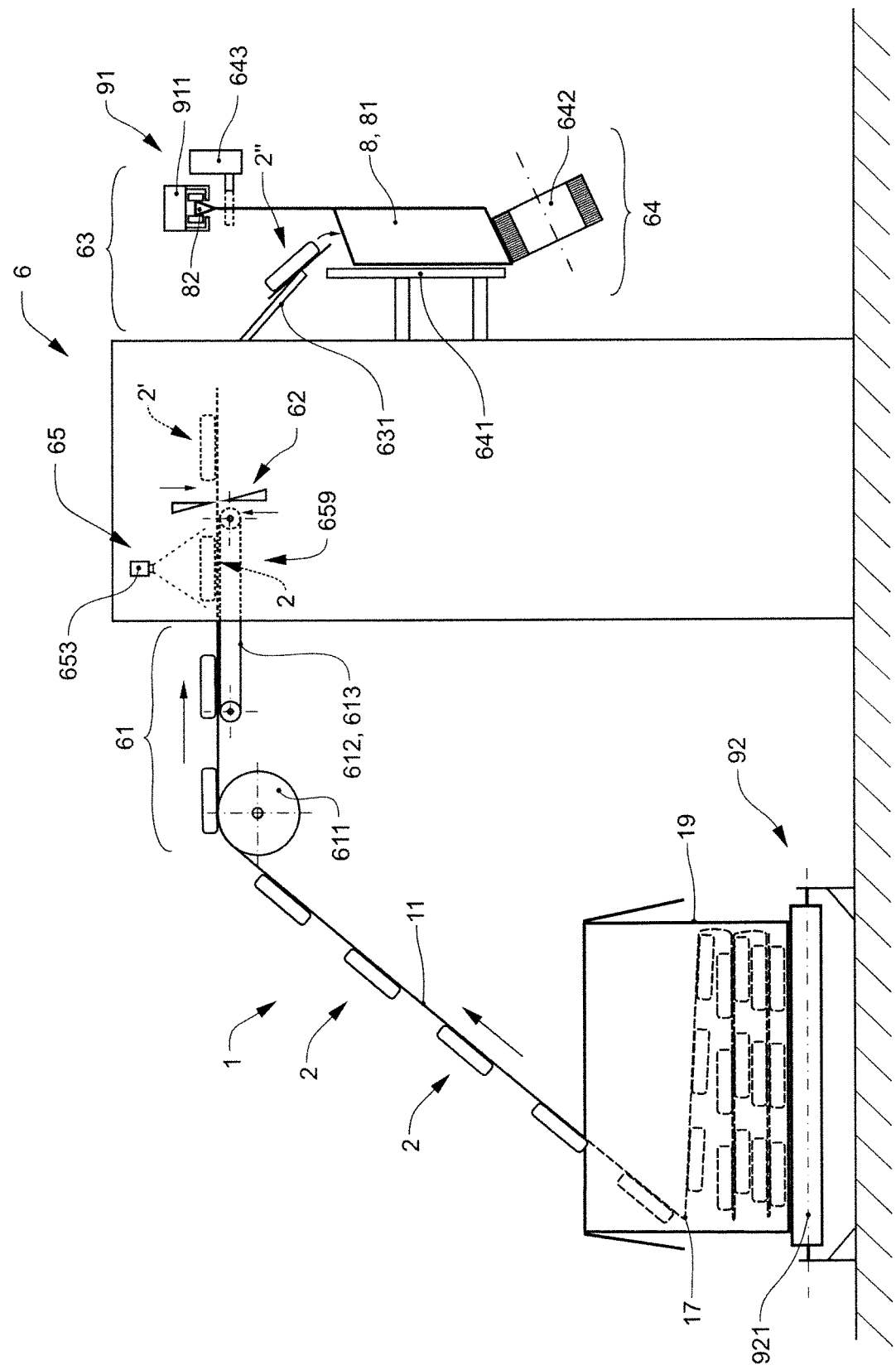
FIG. 18 shows a schematic side view of a device according to the invention for inserting goods units into a transport container, in the form of an overhead conveyor bag.

An advantageous embodiment of a device 6 according to the invention for inserting goods units 3 into a transport container 8 is shown schematically in FIG. 18.

A provided bundle 1 according to the invention in a transport container 19 according to FIG. 13 is provided. In the embodiment shown, the provision takes place on a belt conveyor 921 of a conveyor system. Alternatively, the transport container 19 with the bundle 1 can also be provided manually.

The provided bundle 1 according to the invention is guided via a deflecting roller 611 of a feed module 61 of the device 6 according to the invention onto a horizontal conveying device 613 of the mentioned feed module in the form of a belt conveyor 612. In this case, the propulsion of the bundle strand takes place via drive means (not shown). An identification module of the device 6 is equipped to read out the data element 23 of each packaging unit 2 at an identification position 659 using a camera 653. Advantageously, the identity of the packaging unit 2 can be compared with the read-out data element 23 and verified, on the basis of the acquired image. A separation module 62 is provided to separate a packaging unit 2' from the bundle 1 by severing the carrier strand 11 at the predetermined breaking point.

The separated packaging unit is conveyed to an insertion module 63 of the device 6, for example by means of a belt conveyor or, driven by gravity, —on a chute 631. In the case of the insertion module 63, the packaging unit 2" reaches a conveying device 631, for example a chute, which allows the packaging unit to slide into an opening of a transport container 8, in the present example into an overhead conveyor bag 81 of an overhead conveyor system 91.

The overhead conveyor bag 81 is transferred from a closed state (not shown) into an open filling state by a provision module 64 of the device according to the invention. One possible example of a suitable provision module of this kind is disclosed, for example, in US 2019/0367282 A1.

While an empty overhead conveyor bag 81, already in the orientation provided for filling, is conveyed in a suspended manner on a carriage 82 guided in a running rail 911, the base of the overhead conveyor bag is lifted by a sequence of roller-like actuators 642, as a result of which the suspended conveyor bag is opened. A lateral stop element 641 stabilizes the suspended conveyor bag horizontally, transversely to the conveying direction of the overhead conveyor system. The overhead conveyor bag is stopped and fixed with respect to the running rail 911 by means of a stop element 643. The overhead conveyor bag is now in the filling state. The packaging unit 2" separated from the bundle 1 according to the invention can be inserted into the suspended conveyor bag 81. After the filling, the stop element 643 releases the overhead conveyor bag 81 again. The filled overhead conveyor bag 81 is conveyed further in the overhead conveyor system 91, and the next empty overhead conveyor bag is brought up for filling.

Figure 19:
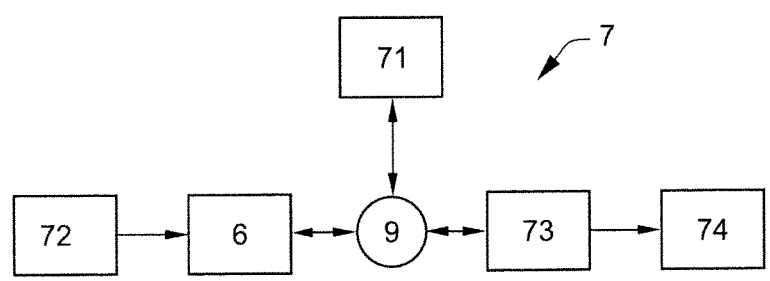
FIG. 19 shows a schematic view of a device according to the invention as part of an intralogistics system.

A device 6 according to the invention is advantageously integrated into a conveyor system 9, in particular a conveyor system of an intralogistics system 7, as shown by way of example as a diagram in FIG. 19. Bundles 1 according to the invention are transported from an external manufacturer to a goods inlet 72. In the goods inlet 72, the bundles 1 are then fed directly into a device 6 according to the invention, which guides the isolated packaging units, having the goods units stored therein, into transport containers of the corresponding conveyor system 9. The transport containers 9 filled in this way can then subsequently be temporarily stored in a warehouse 71, or they are fed to a picking system 73 which then supplies completed orders to a goods output 74.

Figure 20:
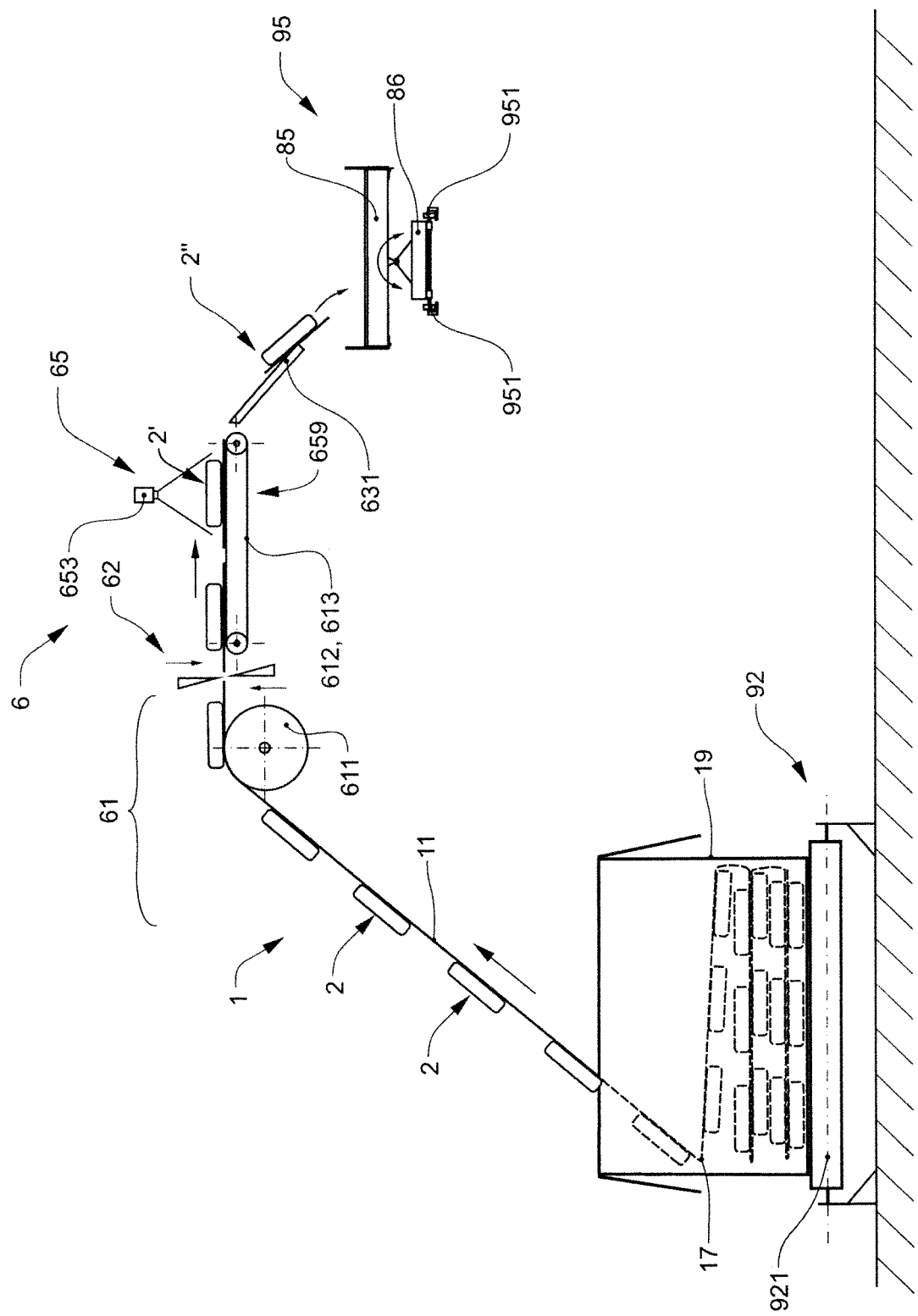
FIG. 20 shows a schematic side view of a further device according to the invention for inserting goods units into a transport container, in the form of a conveying tray.

A further advantageous embodiment of a device 6 according to the invention for inserting goods units 3 into a transport container 8 is shown schematically in FIG. 20. This device corresponds in some parts to the device from FIG. 18, and reference is made to the statements in this regard, in order to avoid repetition.

The bundle 1 provided is guided, via a deflecting roller 611 of a feed module 61 of the device 6, onto a horizontal conveying device 613 of the feed module 61 in the form of a belt conveyor 612. A separation module 62, which is provided to separate a packaging unit 2' from the bundle 1, by severing the carrier strand 11 at the predetermined breaking point, is arranged between the deflecting roller 611 and the belt conveyor 612. The packaging element 2' thus isolated and lying on the belt conveyor 612 is then conveyed further. An identification module 65 of the device 6 reads the data element 23 of the packaging unit 2' using a camera 653. Advantageously, the identity of the packaging unit 2 can in turn be compared with the read-out data element 23 and verified, on the basis of the acquired image.

The separated packaging unit is conveyed to an insertion module 63 of the device 6, for example by means of a belt conveyor or, driven by gravity, —on a chute 631. In the insertion module 63, the packaging unit 2" reaches a conveying device 631, for example a chute, which allows the packaging unit to slide into an opening of a transport container 8, in the present example into a conveying tray 81 of a tilt tray conveyor 95.

In the case of such tilt tray conveyor systems 95 known from the prior art, conveyor trays 85 which can be tilted transversely to the conveying direction on one or two sides are mounted on carriages 86, which are guided in a rolling manner in a running rail 951. The carriages 86 which are uniformly spaced apart from one another are coupled to a revolving chain drive (not shown) and move with constant velocity.

Alternatively or in addition, a stopper element can be provided at the end of chute 631, for example in the form of a pivotable flap at the end of the chute 631, which can swing up. In the swung-up state, the flap can retain a packaging unit on the chute. When a conveying tray of the tilt tray conveyor is located below the chute, the flap swings down, and the retained packaging unit drops into the conveying tray.

In the devices 6 discussed above, the feed module 61 can have one or more horizontal conveyor units arranged in series before and/or after the belt conveyor 612, which can be actuated selectively. In this way, an advantageous buffer storage can be realized, which facilitates synchronization of the provision of the packaging units and the overhead conveyor bags.

It should be understood that various changes, substitutions, and alterations can be made herein without departing from the spirit and scope of the invention as defined by the appended claims. It should also be apparent that individual elements identified herein as belonging to a particular embodiment may be included in other embodiments of the invention. Moreover, the scope of the present application is not intended to be limited to the particular embodiments of the process, machine, manufacture, and composition of matter, means, methods and steps described in the specification. As one of ordinary skill in the art will readily appreciate from the disclosure herein, processes, machines, manufacture, composition of matter, means, methods, or steps, presently existing or later to be developed that perform substantially the same function or achieve substantially the same result as the corresponding embodiments described herein may be utilized according to the present invention.

Additionally, various references are cited throughout the specification, the disclosures of which are each incorporated herein by reference in their entirety.

What is claimed is:

1. A device (6) for inserting goods units (3) into a transport container (8, 81) comprising:
    a module (61) for conveying a bundle (1) for a plurality of goods units (3), comprising a one or two narrow strip-shaped carrier strands (11, 11'), on which a plurality of separately produced packaging units (2, 2', 2", 2''') are attached to the one or two narrow strip- shaped carrier strands and are arranged one behind the other in a row;
    a module (62) for separating packaging elements (2, 2', 2", 2''') from the supplied bundle (1) for the plurality of goods units (3);
    a module (63) for inserting packaging units (2, 2', 2", 2''') separated from the bundle (1) into a transport container (8, 81); and
    a module for providing transport containers;
    wherein the module for providing transport containers is configured to transfer a transport container in a form of an overhead conveyor bag from a closed state into an open state.

2. The device according to claim 1, comprising a module (65) for identifying bundles (1) and/or packaging units (2, 2', 2", 2''') and/or goods units (3).

3. The device according to claim 1, wherein the module (64) for providing transport containers is configured to receive a transport container (8, 81) from a conveyor system (9, 91) and/or to transfer a transport container (8, 81) to a conveyor system (9, 91).

4. The device according to claim 1, wherein the module (64) for providing transport containers is configured to align a transport container (8) in the form of an overhead conveyor bag (81) of an overhead conveyor system (91) before the goods unit (3) is inserted.

5. The device according to claim 4, wherein the module (64) for providing transport containers is configured to rotate the overhead conveyor bag (81) from a conveying position into a filling position before the goods unit (3) is inserted.

6. The device according to claim 1, wherein the device (6) is integrated into a conveyor system (9, 91) of an intralogistics system (7).

7. A method for inserting goods units (3) into a transport container (8, 81) using the device of claim 1, comprising the steps of:
    separating at least one packaging unit (2, 2', 2", 2'''), which contains at least one goods unit (3), from the bundle (1); and
    inserting the at least one separated packaging unit (2, 2', 2", 2''') into the transport container (8, 81).

8. The method according to claim 7, wherein the packaging units (2, 2', 2", 2''') are separated from the bundle (1) in a row along the carrier strand (11, 11').

9. The method according to claim 7, wherein the packaging units (2, 2', 2", 2''') are separated from the bundle (1) and inserted into the transport container (8, 81) in groups of two or more packaging units.

10. The method according to claim 7, wherein the transport container (8) provided is a transport container of a conveying system (9) comprising an overhead conveyor bag (81) of an overhead conveyor system (91).

11. The method according to claim 10, wherein, to insert the at least one separated packaging unit (2, 2', 2", 2''') into a transport container (8, 81), said transport container is stopped in the conveying system (9) and the at least one packaging unit is subsequently inserted into the transport container.

12. The method according to claim 10, wherein, to insert the at least one separated packaging unit (2, 2', 2", 2''') into a transport container (8, 81), said transport container is continuously conveyed in the conveying system (9), and wherein the insertion of the at least one packaging unit takes place into the moving transport container.

13. The method according to claim 10, wherein the transport container (8) in the form of the overhead conveyor bag (81) of the overhead conveyor system (91) is transferred from a closed state into an open state before the goods unit (3) is inserted.

14. The method according to claim 10, wherein the transport container (8) in the form of the overhead conveyor bag (81) of the overhead conveyor system (91) is aligned before the goods unit (3) is inserted.

15. The method according to claim 14, wherein the overhead conveyor bag (81) is rotated from a conveying position into a filling position before the goods unit (3) is inserted.

* * * * *